Aug. 7, 1951     A. C. MITCHELL     2,563,735
SECURING MEANS FOR PARTITION STUDS
Filed Nov. 2, 1946
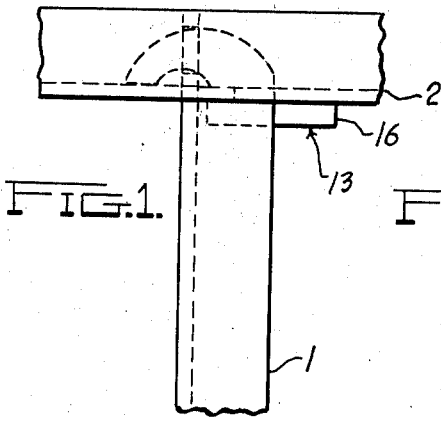
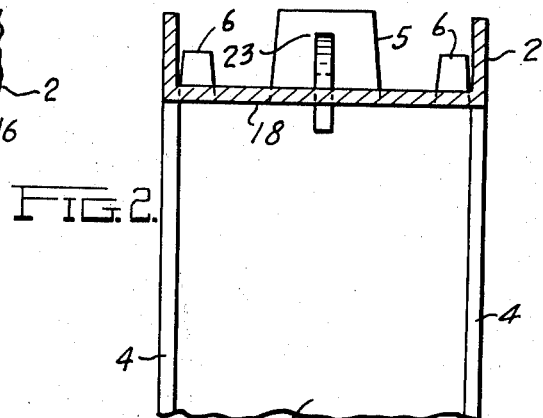
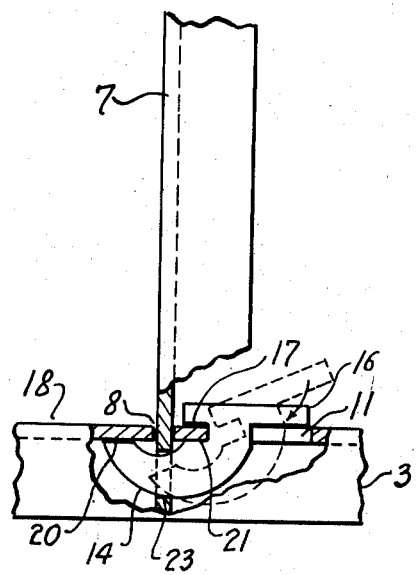
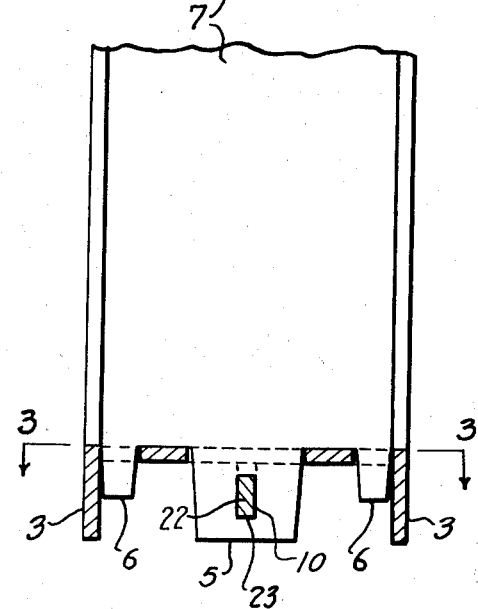
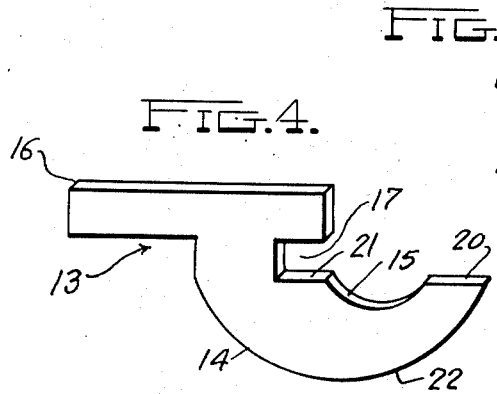
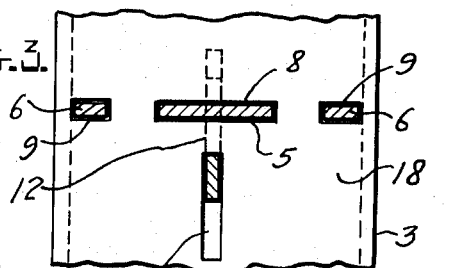
INVENTOR.
Alvan C. Mitchell
BY
Barnes, Kisselle, Laughlin & Raisch
ATTORNEYS Patented Aug. 7, 1951

2,563,735

UNITED STATES PATENT OFFICE 2,563,735

SECURING MEANS FOR PARTITION STUDS

Alvan C. Mitchell, Sarnia, Ontario, Canada

Application November 2, 1946, Serial No. 707,367

6 Claims. (Cl. 189—36)

This invention relates to securing means for a partition stud and in particular to a means for securing a partition stud to a sill plate.

This invention relates to a partition stud and sill arrangement which lends itself admirably for use in prefabricated housing. My arrangement provides for a stud for a partition and means for securing it to the cap and sill plates which can be mass produced and readily and easily installed during the assembly of the prefabricated house without requiring any special or complicated tools or experience on the part of the person doing the assembling. Further, my simple locking mechanism will securely lock the partition to both the sill and cap plates.

It is an object of this invention to produce means for securing a partition stud to a sill plate which is efficient, of simple structure, easy and expeditious to install, which will effectively lock the stud in place, and which readily lends itself to use in prefabricated housing.

Fig. 1 is a side elevation showing my partition stud secured to the sill and cap plates.

Fig. 2 is a front elevation of the same.

Fig. 3 is a section along the line 3—3 of Fig. 2.

Fig. 4 is a detail perspective of the securing wedge.

For descriptive purposes I have shown my partition stud, cap and sill plates and securing wedge made from metal but the same could be made from wood or other suitable load bearing material conventionally used in buildings.

My partition stud takes the form of a metal channel I which is mounted between a channel cap plate 2 and a sill plate 3 also of channel section. The flanges of my stud I are designated 4.

The stud I is symmetrical about a central horizontal axis and is provided with a main projecting finger 5 and two auxiliary fingers 6 at each end. Fingers 5 and 6 are positioned in the same plane and are preferably integral extensions of the body portion 7 of stud I. Fingers 5 and 6 have their side edges tapered slightly inwardly toward each other.

The cap and sill plates 2 and 3 are each provided with a main opening 8 and two auxiliary openings 9 which are aligned transversely of the sill and cap plates. Openings 8 are arranged to snugly receive finger 5 and openings 9 are arranged to snugly receive auxiliary fingers 6. Each main finger 5 is provided with an opening 10 positioned centrally thereof and extending parallel to the side edges of stud I. The sill and cap plates are each provided with an elongated opening 11 positioned perpendicular to opening 8 and spaced therefrom as at 12.

The wedge member, generally designated 13, is shown in Fig. 4. Wedge member 13 has an outer edge 14 and an inner edge 15 which are referably each arcs of different circles having different centers. Arc 14 has a greater radius than the radius of arc 15. Each wedge 13 is provided with a handle portion 16 and a notch 17 which interengages the base 18 of the sill or cap plates. Flat seats 20 and 21 are located in the same plane on opposite sides of arcuate edge 15.

Stud I is positioned perpendicular with respect to sill plate 3 and fingers 5 and 6 slipped into openings 8 and 9. At this time the lower edges of flanges 4 will rest upon the base 18 of sill 3. The main body portion 22 of wedge 13 is now passed through opening 11 in base 18 of sill plate 3 and thence forwardly through opening 10 in main finger 5. At this time seats 20 and 21 will contact the bottom surface of base 18 of the sill plate (Fig. 1) and upon sliding the wedge 22 forwardly, as indicated in Fig. 1, outer arcuate edge 14 will wedge itself against the lower face 23 of opening 10 while seats 20 and 21 react against the underside of base 18. As wedge 14 is slipped to the left, Fig. 1, notch 17 slips over base 18 to lock the wedge in place. Thus, it will be seen that the wedge 13 can be positioned in place to interengage sill 3 and stud I from the upper side of sill 3 and thus avoids the need for getting down under sill 3 which would be impractical where the underside of sill 3 is boxed in. After a plurality of studs I are mounted upon a sill plate 3, then the cap plate 2 can be mounted upon the upper end of the stud I and secured thereto in the same manner that the lower end of the stud is secured to sill 3. In connecting the stud to the cap plate, wedge 13 is secured in place from the under or sealing side of cap plate 2.

If at any time it is desired to disconnect stud I from either or both sill 3 or cap plate 2, this can be done in the case of each wedge by prying finger 16 outwardly away from the base of the sill or cap plate, which automatically disengages wedge portion 22 from opening 10.

I claim:

1. In combination a stud, a plate, a projection on said stud, an opening in said plate through which said projection extends, a second opening extending through said plate, an opening in said projection, a wedge having a cam face and a pair of spaced shoulders opposite said cam face, said wedge being assembled from the stud side of said plate through said second opening for interengaging said projection on the other side of the plate to lock the stud to said plate, the said shoulders on said wedge engaging the underside of said plate and the opposite cam face of the wedge member engaging the side of the opening in said projection remote from the underside of the plate.

2. The combination as set forth in claim 1 wherein the cam face of said wedge is arcuate.

3. The combination as set forth in claim 1 wherein the cam face of said wedge is arcuate and the wedge is provided with a socket for interengagement with the plate adjacent said second opening to lock the wedge in place.

4. In combination a stud, a plate positioned transversely of said stud at one end thereof, a projection on said stud, an opening in said plate through which said projection extends, an opening in said projection, a second opening in said plate, and a wedge member interengaging the opening in said projection and the underside of said plate to lock the plate and stud together, said wedge member being assembled from the top side of said plate by passing the same through said second opening, said wedge member when in interengaged position having a portion extending upwardly through said second opening.

5. The combination as set forth in claim 4 including a socket in said wedge member interengaging the plate at the edge of said opening to thereby lock the wedge in position.

6. In combination a stud, a plate positioned transversely of said stud at one end thereof, a projection on said stud, an opening in said plate through which said projection extends, an opening in said projection, a second opening in said plate, and a wedge member interengaging the opening in said projection and the underside of said plate to lock the plate and stud together, said wedge member having a portion positioned in said second opening and a recess overlapping the plate at the edge of said opening adjacent said second stud, the said wedge being assembled by passing the same through said second opening from the top side of said plate downwardly and then forwardly through the opening in said projection to thereby interengage the projection in said opening and to interengage the recessed portion of said wedge member with the plate.

ALVAN C. MITCHELL.

REFERENCES CITED

The following references are of record in the file of this patent:

UNITED STATES PATENTS

| Number | Name | Date |
| --- | --- | --- |
| 642,011 | Sill | Jan. 23, 1900 |
| 756,749 | Watts, Jr. | Apr. 5, 1904 |
| 1,358,687 | Lyon | Nov. 9, 1920 |
| 1,681,340 | Hauserman et al. | Aug. 21, 1928 |
| 2,040,374 | Grimes | May 12, 1936 |
| 2,308,242 | Hohl | Jan. 12, 1943 |
| 2,375,409 | Glitsch | May 8, 1945 |
| 2,379,752 | Schultz | July 3, 1945 |

Certificate of Correction

Patent No. 2,563,735                                            August 7, 1951

ALVAN C. MITCHELL

It is hereby certified that error appears in the printed specification of the above numbered patent requiring correction as follows:

Column 3, line 29, and column 4, line 8, after "said" insert *second*; column 4, line 9, strike out "second";

and that the said Letters Patent should be read as corrected above, so that the same may conform to the record of the case in the Patent Office.

Signed and sealed this 6th day of November, A. D. 1951.

[SEAL]

THOMAS F. MURPHY,
*Assistant Commissioner of Patents.*